US010656874B2

(12) United States Patent
Qiu et al.

(10) Patent No.: US 10,656,874 B2
(45) Date of Patent: May 19, 2020

(54) STORAGE DEVICE OPERATION CONTROL METHOD, AND STORAGE DEVICE

(71) Applicant: Huawei Technologies Co., Ltd., Shenzhen (CN)

(72) Inventors: Xin Qiu, Shenzhen (CN); Dengben Wu, Hangzhou (CN); Ligang Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 6 days.

(21) Appl. No.: 15/965,132

(22) Filed: Apr. 27, 2018

(65) Prior Publication Data
US 2018/0246675 A1    Aug. 30, 2018

Related U.S. Application Data

(63) Continuation of application No. PCT/CN2016/095534, filed on Aug. 16, 2016.

(30) Foreign Application Priority Data

Oct. 28, 2015 (CN) .......................... 2015 1 0711287

(51) Int. Cl.
G06F 3/06         (2006.01)
G06F 21/62        (2013.01)
G06F 13/16        (2006.01)

(52) U.S. Cl.
CPC .......... G06F 3/0659 (2013.01); G06F 3/0604 (2013.01); G06F 3/0637 (2013.01);
(Continued)

(58) Field of Classification Search
CPC .... G06F 3/0659; G06F 3/0604; G06F 3/0635; G06F 3/0631; G06F 3/06; G06F 3/0637;
(Continued)

(56) References Cited

U.S. PATENT DOCUMENTS 4,864,511 A * 9/1989 Moy .................. G06F 3/0601
                                                 700/218
8,935,751 B1 * 1/2015 Cardente ............... G06F 16/10
                                                       726/4
(Continued)

FOREIGN PATENT DOCUMENTS

CN         1667597 A      9/2005
CN       101271435 A      9/2008
(Continued)

Primary Examiner — Mano Padmanabhan
Assistant Examiner — Jean C Edouard
(74) Attorney, Agent, or Firm — Leydig, Voit & Mayer, Ltd.

(57) ABSTRACT

The present application relates to a storage device operation control method, a storage device, and a management node. The method includes: receiving at least one request sent by at least one management node; and when one of the at least one request is a permission application request, determining, according to a current permission status, whether to assign operation permission to a management node that sends the permission application request; or when one of the at least one request is an operation request, determining, according to a current permission status, whether a management node that sends the operation request has operation permission, and performing an operation according to the operation request when the management node that sends the operation request has the operation permission. This avoids a conflict caused by simultaneously performing an operation on a storage device by multiple management nodes, and prevents successive serial operations from being interrupted.

17 Claims, 7 Drawing Sheets

(52) U.S. Cl.
CPC ........ *G06F 3/0679* (2013.01); *G06F 13/1605* (2013.01); *G06F 21/62* (2013.01)

(58) Field of Classification Search
CPC .... G06F 3/0679; G06F 3/0688; G06F 3/0611; G06F 3/061; G06F 3/067; G06F 3/0683; G06F 3/0647; G06F 12/0868; G06F 12/0246; G06F 12/0871; G06F 13/1605; G06F 13/16; G06F 13/1668; G06F 21/62; G06F 21/10; G06F 21/121; G06F 21/105
USPC .......................................................... 711/103
See application file for complete search history.

(56) References Cited

U.S. PATENT DOCUMENTS

| | | | |
|---|---|---|---|
| 2004/0073730 A1 | 4/2004 | Horii et al. | |
| 2008/0065801 A1 | 3/2008 | Fukuyama et al. | |
| 2008/0065802 A1 | 3/2008 | Watanabe et al. | |
| 2008/0071983 A1 | 3/2008 | Kamei et al. | |
| 2009/0031131 A1* | 1/2009 | Qiu | H04L 63/0442 713/172 |
| 2010/0174840 A1 | 7/2010 | Blainey et al. | |
| 2011/0258454 A1* | 10/2011 | Qiu | H04L 63/08 713/176 |
| 2013/0086311 A1* | 4/2013 | Huang | G06F 13/1689 711/103 |
| 2013/0185173 A1* | 7/2013 | Zheng | G06Q 30/06 705/26.41 |
| 2013/0198311 A1* | 8/2013 | Tamir | G06F 15/167 709/212 |
| 2013/0339714 A1* | 12/2013 | Hormuth | G06F 15/17331 713/2 |
| 2014/0047180 A1* | 2/2014 | Ling | G06F 3/0689 711/114 |
| 2014/0123220 A1* | 5/2014 | Sprunk | G06F 21/121 726/2 |
| 2014/0317336 A1* | 10/2014 | Fitch | G06F 12/109 711/103 |
| 2015/0370700 A1* | 12/2015 | Sabol | G06F 12/0246 711/103 |
| 2016/0127468 A1* | 5/2016 | Malwankar | G06F 9/45558 709/212 |

FOREIGN PATENT DOCUMENTS

| | | |
|---|---|---|
| CN | 101980140 A | 2/2011 |
| CN | 102272744 A | 12/2011 |
| CN | 103944856 A | 7/2014 |
| CN | 104536834 A | 4/2015 |

* cited by examiner

| | Status register | RC_0 | RC_1 | BMC0 | BMC1 | BMC2 | BMC3 |
|---|---|---|---|---|---|---|---|
| A | 0 | 0 | 0 | 0 | 0 | 0 | 0 |
| B | 0 | 0 | 0 | 1 | 0 | 0 | 0 |
| C | 1 | 0 | 0 | 1 | 0 | 0 | 0 |
| D | 0 | 0 | 0 | 1 | 0 | 0 | 0 |
| E | 0 | 0 | 0 | 0 | 0 | 0 | 0 |

# STORAGE DEVICE OPERATION CONTROL METHOD, AND STORAGE DEVICE

CROSS-REFERENCE TO RELATED APPLICATIONS

This application is a continuation of International Application No. PCT/CN2016/095534, filed on Aug. 16, 2016, which claims priority to Chinese Patent Application No. 201510711287.3, filed on Oct. 28, 2015. The disclosures of the aforementioned applications are hereby incorporated by reference in their entireties.

TECHNICAL FIELD

The present application relates to the field of dynamic databases, and in particular, to a storage device operation control method, and a storage device.

BACKGROUND

A non-volatile memory express (NVMe) protocol supports a device management command, so as to directly perform an operation on a storage device. This ensures that an existing baseboard management controller (BMC) can directly perform an operation on a storage device. The NVMe protocol can support multi-channel management. For example, an NVMe management interface (NVMe-MI) protocol can support management of the Management Component Transport Protocol (MCTP) by simultaneously using multiple channels such as an inter-integrated circuit (IIC or I2C) and a peripheral component interconnect express (PCIE). As shown in FIG. 1, a management node sends a management command to a storage device by using an NVMe management interface. The management command may be a read or write operation command on the storage device. As shown in FIG. 2, the storage device may include multiple management interfaces. When multiple management nodes send management commands by using the multiple management interfaces, an operation conflict is caused by simultaneously accessing the storage device by the multiple management nodes.

SUMMARY

Embodiments of the present application provide a storage device operation control method, a storage device, and a management node. Operation permission is assigned to one of multiple management nodes requesting to apply for permission, and a corresponding operation is performed according to an operation request sent by the management node having the operation permission. This avoids a conflict caused by simultaneously performing an operation on a storage device by multiple management nodes.

According to a first aspect, an embodiment of the present application provides a storage device operation control method. The method includes: receiving a request sent by at least one management node, and determining a type of the received request; and when the request is a permission application request, determining, according to a current permission status, whether to assign operation permission to a management node that sends the permission application request; or when the request is an operation request, determining, according to a current permission status, whether a management node that sends the operation request has operation permission, and performing an operation according to the operation request when the management node that sends the operation request has the operation permission.

In the first aspect, a status about permission assignment of an access interface and a request execution status are recorded in the current permission status. In the first aspect, the current permission status may be determined by querying the status table, or may be determined in another manner.

Based on the foregoing technical solution, the type of the received request is determined, and it is determined, according to the type of the request, whether to assign operation permission to one of at least one management node that sends a permission application request or whether the management node that sends the operation request has the operation permission. The operation is performed according to the operation request sent by the management node having operation permission. This avoids a conflict caused by simultaneously performing an operation by multiple management nodes.

With reference to the first aspect, in a first possible implementation of the first aspect, a status table is updated when it is determined that the operation permission is assigned to one of the at least one management node that sends the permission application request, so as to determine, according to the status table, whether the operation permission can be assigned to the management node that sends the permission application request or whether the management node that sends the operation request has the operation permission, thereby determining operation permission and validity of multiple management nodes.

With reference to the first implementation of the first aspect, in a second possible implementation of the first aspect, after the operation permission is assigned to one of the at least one management node that sends the permission application request and the status table is updated, a response message is sent to the management node that sends the permission application request, so that the management node that sends the permission application request sends an operation request to a storage device according to the response message.

With reference to the first aspect, in a third possible implementation of the first aspect, the determining, according to the status table, whether the management node that sends the operation request has the operation permission includes: querying whether a management node marked as having operation permission in the status table is the management node that sends the operation request; and when the management node marked as having operation permission in the status table is the management node that sends the operation request, determining that the management node that sends the operation request has the operation permission.

With reference to any one of the foregoing possible implementations, in a fourth possible implementation of the first aspect, after the performing an operation according to the operation request sent by the management node having the operation permission is completed, the method further includes: releasing the operation permission, so that the operation permission is assigned to another management node that sends a request.

With reference to the first aspect, in a fifth possible implementation of the first aspect, after the receiving a request sent by at least one management node, the method further includes: serializing the received request, to sequentially parse the request in a time sequence of receiving the request.

According to a second aspect, an embodiment of the present application provides a storage device operation control method. The method includes: sending a permission application request to a storage device, so that the storage device assigns, according to the permission application request, operation permission to a management node that sends the permission application request, and sends a response message to the management node; receiving the response message sent by the storage device; and sending an operation request to the storage device according to the response message, so that the storage device performs an operation according to the operation request.

Based on the storage device operation control method according to the second aspect, before an operation is performed on the storage device, the operation permission is first applied for to the storage device. When having the operation permission, the management node sends the operation request, so that the storage device performs the operation according to the operation request. This avoids a conflict caused by simultaneously performing an operation on the storage device by multiple management nodes.

According to a third aspect, an embodiment of the present application provides a storage device. The storage device includes a receiving module and a processing module. The receiving module is configured to receive a request sent by at least one management node. The processing module is configured to determine a type of the request; and when the request is a permission application request, determine whether to assign operation permission to a management node that sends the permission application request; or when the request is an operation request, determine whether a management node that sends the operation request has operation permission, and perform an operation according to the operation request when the management node that sends the operation request has the operation permission.

In the third aspect, the processing module may determine, according to a status table, whether to assign the operation permission to the management node that sends the permission application request, or whether the management node that sends the operation request has operation permission.

The type of the received request is determined, and it is determined, according to the type of the request, whether to assign the operation permission to the management node that sends the request or whether the management node that sends the request has the operation permission. This can avoid a conflict caused by performing an operation by multiple management nodes.

With reference to the third aspect, in a first possible implementation of the third aspect, the processing module is further configured to update a status table when the operation permission is assigned to the management node that sends the permission application request, so as to determine, according to the status table, whether the operation permission can be assigned to the management node that sends the permission application request or whether the management node that sends the operation request has the operation permission, thereby determining operation permission and validity of multiple management nodes.

With reference to the first possible implementation of the third aspect, in a second possible implementation of the third aspect, the storage device further includes a sending module, configured to send a response message to the management node that sends the permission application request, so that the management node that sends the permission application request sends an operation request to the storage device according to the response message.

With reference to the third aspect, in a third possible implementation of the third aspect, the processing module is configured to: query whether a management node marked in the status table is the management node that sends the operation request; and when the management node marked in the status table is the management node that sends the operation request, determine that the management node that sends the operation request has the operation permission.

With reference to any one of the foregoing possible implementations, in a fourth possible implementation of the third aspect, the storage device further includes a release module, configured to release the operation permission, so that the operation permission is assigned to another management node that sends a request.

With reference to the third aspect, in a fifth possible implementation of the third aspect, the processing module is further configured to: serialize the received request, to parse the request in a time sequence of receiving the request.

According to a fourth aspect, an embodiment of the present application provides a management node. The management node includes a sending module and a receiving module. The sending module is configured to send a permission application request to a storage device, so that the storage device assigns operation permission according to the received permission application request, and sends a response message to the management node that sends the permission application request. The receiving module is configured to receive the response message sent by the storage device. The sending module sends an operation request to the storage device according to the response message, so that the storage device performs an operation according to the operation request.

The permission application request is first sent to the storage device to apply for operation permission, and a corresponding operation is performed according to the operation request after the operation permission is obtained. This avoids a conflict caused by operation requests of multiple management nodes.

According to a fifth aspect, an embodiment of the present application provides a storage device. The storage device includes at least one access interface, for example, a service access interface, a management interface, a memory, and a processor.

The memory is configured to store an instruction and a permission status.

The processor is configured to invoke the instruction stored in the memory, to perform the following steps:

receiving, by using the at least one access interface, at least one request sent by at least one management node; and when one of the at least one request is a permission application request, determining, according to a current permission status, whether to assign operation permission to a management node that sends the permission application request; or when one of the at least one request is an operation request, determining, according to a current permission status, whether a management node that sends the operation request has operation permission, and performing an operation according to the operation request when the management node that sends the operation request has the operation permission.

According to a sixth aspect, an embodiment of the present application provides a non-volatile computer-readable storage medium that stores one or more programs. The one or more programs include an instruction, and the instruction is used by a storage device to perform the following steps:

receiving at least one request sent by at least one management node; and when one of the at least one request is a permission application request, determining, according to a current permission status, whether to assign operation permission to a management node that sends the permission application request; or when one of the at least one request is an operation request, determining, according to a current permission status, whether a management node that sends the operation request has operation permission, and performing an operation according to the operation request when the management node that sends the operation request has the operation permission.

According to the foregoing aspects, when the current permission status is that a request is received, a status about permission assignment and a request execution status are recorded in a memory. A permission status may be represented in a status table or may be represented in another logical manner.

Based on the foregoing technical solutions, according to the storage device operation control method, the storage device, and the management node that are provided in the embodiments of the present application, the storage device assigns the operation permission to one of multiple management nodes requesting to apply for permission, and performs a corresponding operation according to an operation request sent by the management node having the operation permission. This avoids a conflict caused by simultaneously performing an operation on a storage device by multiple management nodes, and prevents successive serial operations from being interrupted.

BRIEF DESCRIPTION OF DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

DESCRIPTION OF EMBODIMENTS

The technical solutions of the present application are further described in detail below with reference to the accompanying drawings and the embodiments.

A method, a management node, and a storage device that are provided in the embodiments of the present application are applied to a non-volatile memory express (NVMe) protocol. NVMe can reduce a data read/write delay and provide higher performance. NVMe can support a device management command, so as to directly perform an operation on a storage device. The storage device may simultaneously receive operation requests sent by multiple management nodes. The management node may be a baseboard management controller (BMC) or a host. Because an operation request may be a read or write operation command, when multiple hosts or BMCs simultaneously access the storage device, operations to be performed on the storage device may be exclusive. Alternatively, for example, for some serial operations, in a process of performing a corresponding operation, the successive serial operations are interrupted by executing another operation request. In this case, before an operation is performed on the storage device, the storage device first assigns, to a management node, permission to perform an operation. Then, the storage device performs a corresponding operation according to an operation request sent by the management node having the permission, and releases the permission after performing the operation, so that the storage device is used by another management node to perform another operation.

In the embodiments of the present application, the storage device is used as a device for storing information. The device may be a hard disk, including a solid state disk (for example, an SSD disk), a hard disk drive (a conventional HDD disk), or the like, or may be another device that stores information.

The following clearly describes the technical solutions in the embodiments of the present application with reference to the accompanying drawings in the embodiments of the present application. Apparently, the described embodiments are a part rather than all of the embodiments of the present application. All other embodiments obtained by a person of ordinary skill in the art based on the embodiments of the present application without creative efforts shall fall within the protection scope of the present application.

Figure 1:
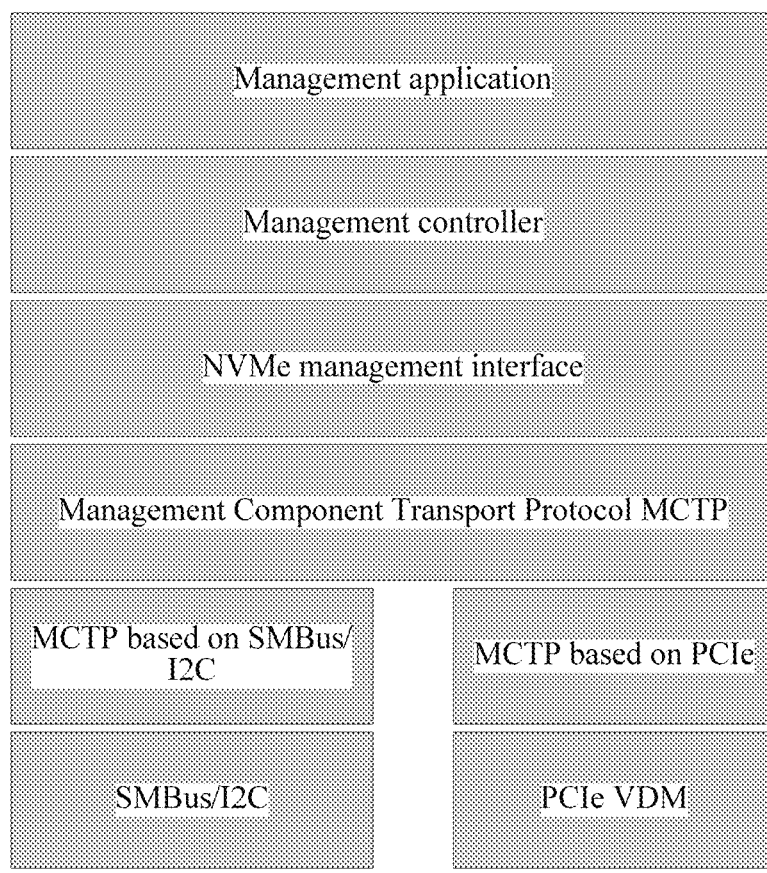
FIG. 1 is a hierarchical diagram of an NVMe management system in the prior art.
Figure 2:
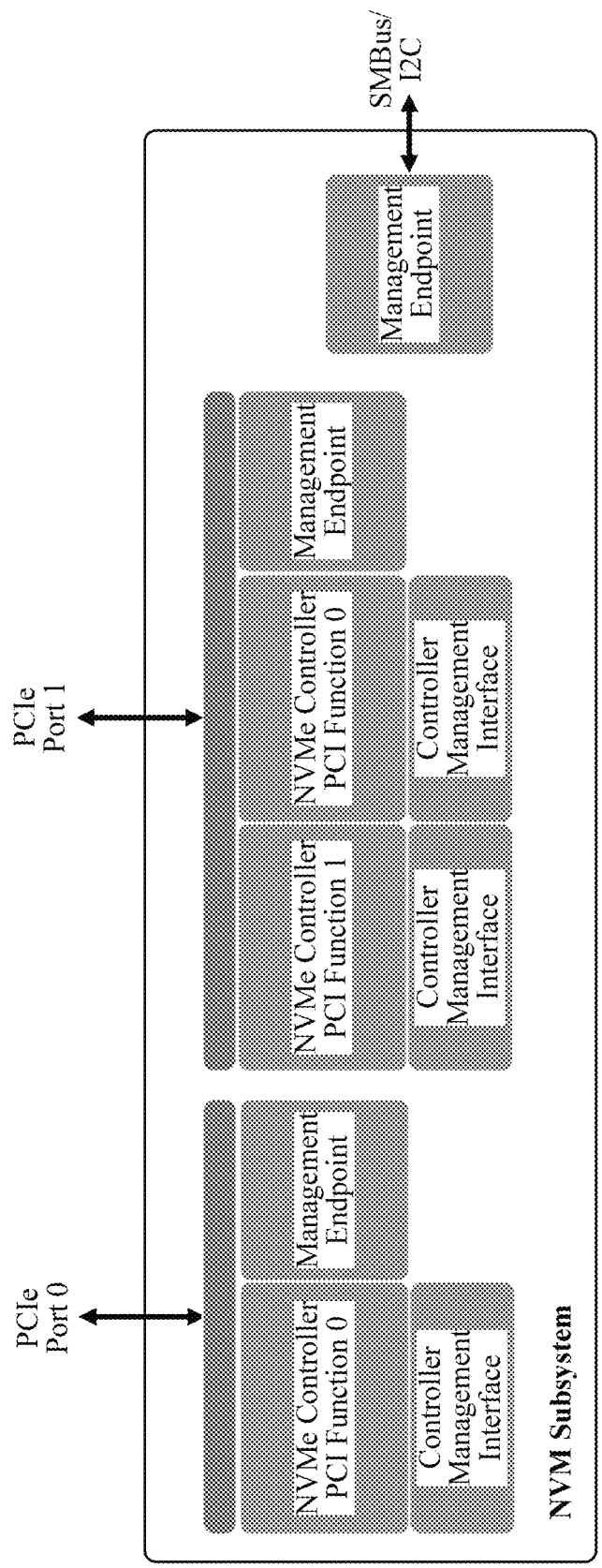
FIG. 2 is a schematic structural diagram of an NVMe management subsystem in the prior art.
Figures 3, 4:
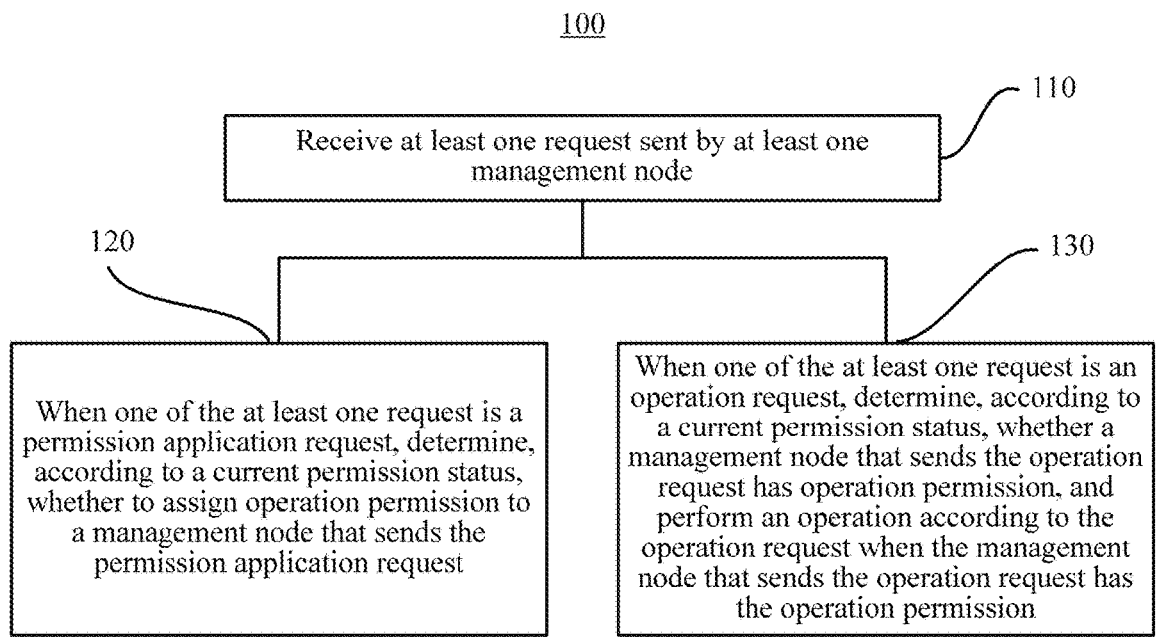
FIG. 3 is a schematic flowchart of a storage device operation control method according to an embodiment of the present application.
FIG. 4 is a schematic diagram of a status table according to an embodiment of the present invention.

FIG. 3 is a schematic flowchart of a storage device operation control method according to an embodiment of the present application. As shown in FIG. 3, the method 100 is executed by a storage device, and the method 100 includes the following steps:

110: Receive at least one request sent by at least one management node.

120: When one of the at least one request is a permission application request, determine, according to a current permission status, whether to assign operation permission to a management node that sends the permission application request.

130: When one of the at least one request is an operation request, determine, according to a current permission status, whether a management node that sends the operation request has operation permission, and perform an operation according to the operation request when the management node that sends the operation request has the operation permission.

Specifically, in this embodiment of the present application, the storage device is a device for storing information. The device may be a hard disk, including a solid state disk (for example, an SSD disk), a hard disk drive (a conventional HDD disk), or the like, or may be another device that stores information. The management node may be a host or BMC. In step 110, the storage device receives requests sent by multiple management nodes. The request may be a permission application request or an operation request. The storage device sequentially determines types of the received requests, and determines whether the received requests are permission application requests or operation requests. In step 120, when a received request is the permission application request, the storage device determines, according to the current permission status, whether there is permission to be assigned to the management node that sends the permission application request.

In this embodiment of the present application, the current permission status may be obtained by querying a status table, to determine whether there is operation permission to be assigned to the management node that sends the permission application request or whether a current status is that an operation is being currently performed. In this embodiment of the present application, the storage device may further determine the current permission status in another preset logical manner. In this embodiment of the present application, the current permission status is a permission status at a time point when the storage device receives the request.

For example, as shown in FIG. 4, the status table may include two groups: one is a permission status group, and the other is a request execution status group. The permission status group is used to indicate operation permission of each management node, and the request execution status group is used to record whether the storage device is performing a requested operation. In the permission status group, "1" indicates that a corresponding management node has operation permission, and "0" indicates that a corresponding management node does not have operation permission.

When the storage device currently performs no operation, and does not assign operation permission to another management node, as shown by A in FIG. 4, permission statuses of management nodes in the permission status group and a status of the request execution status group are all "0". In this case, the storage device can assign operation permission to a management node that sends a permission application request. In a same time period, the storage device allows one management node to obtain operation permission. When the storage device receives a permission application command sent by a management node, for example, BMC0, the storage device may assign operation permission to the management node BMC0. As shown by B in FIG. 4, in the permission status group, BMC0 is marked as having operation permission and is denoted as "1"; management nodes, such as BMC1, BMC2, and BMC3, that do not have operation permission are all marked and denoted as "0".

In step 130, when a received request is the operation request, it is determined, according to the status table, whether the management node that sends the operation request has the operation permission. As shown by B in FIG. 4, it is determined whether the management node that sends the operation request and a management node that is recorded in the status table as having operation permission are a same management node. It should be noted herein that in an entire system, each management node has a unique identifier or name, to ensure that the management node that is recorded in the status table as having operation permission and the management node that sends the operation request are the same management node. When determining that the management node that sends the operation request and the management node that is recorded in the status table as having operation permission are the same management node, the storage device performs a corresponding operation according to the operation request. The operation is a read or write operation performed by the management node on the storage device. When performing an operation, the storage device may automatically update the status table, to set a state in the status table to a state of currently performing an operation. That is, as shown by C in FIG. 4, the status of the request execution status group is updated to "1" indicating a state of currently performing an operation from "0" indicating a state of performing no operation. In this way, when receiving an operation request sent by another management node such as BMC1, BMC2, or BMC3, the storage device no longer performs an operation according to a corresponding operation request. This avoids problems that the storage device simultaneously executes operation requests sent by multiple management nodes and that the operation requests sent by the multiple management nodes are exclusive, and can prevent serial operations from being interfered or interrupted by an operation request sent by another management node.

After the management node BMC0 has completed the corresponding operation, the storage device automatically marks the request execution status table in the status table as "0" indicating the state of performing no operation. The status table is shown by D in FIG. 4.

It should be noted that in this embodiment of the present application, the operation request may be a read operation request, a write operation request, or another operation request.

According to the storage device operation control method provided in this embodiment of the present application, the storage device assigns operation permission to one of multiple management nodes requesting to apply for permission, and performs a corresponding operation according to an operation request sent by the management node having the operation permission. This avoids a conflict caused by simultaneously performing an operation on a storage device by multiple management nodes, and prevents successive serial operations from being interrupted.

It should be understood that in this embodiment of the present application, the request may be a predefined request set. When some storage devices executing some predefined requests, the other storage devices execute the other predefined requests.

It should be understood that in this embodiment of the present application, alternatively, in the permission status group, "0" may indicate that a corresponding management node has operation permission, and "1" may indicate that a corresponding management node does not have operation permission. Alternatively, in the permission status group, a digit in another numeral system used in computers may be used to represent a mark indicating that a management node has operation permission. This is not limited in this embodiment of the present application.

It should be noted that in this embodiment of the present application, a data definition in the status table is extensible, and is not limited to data in the status table provided in this embodiment of the present application.

Figure 5:
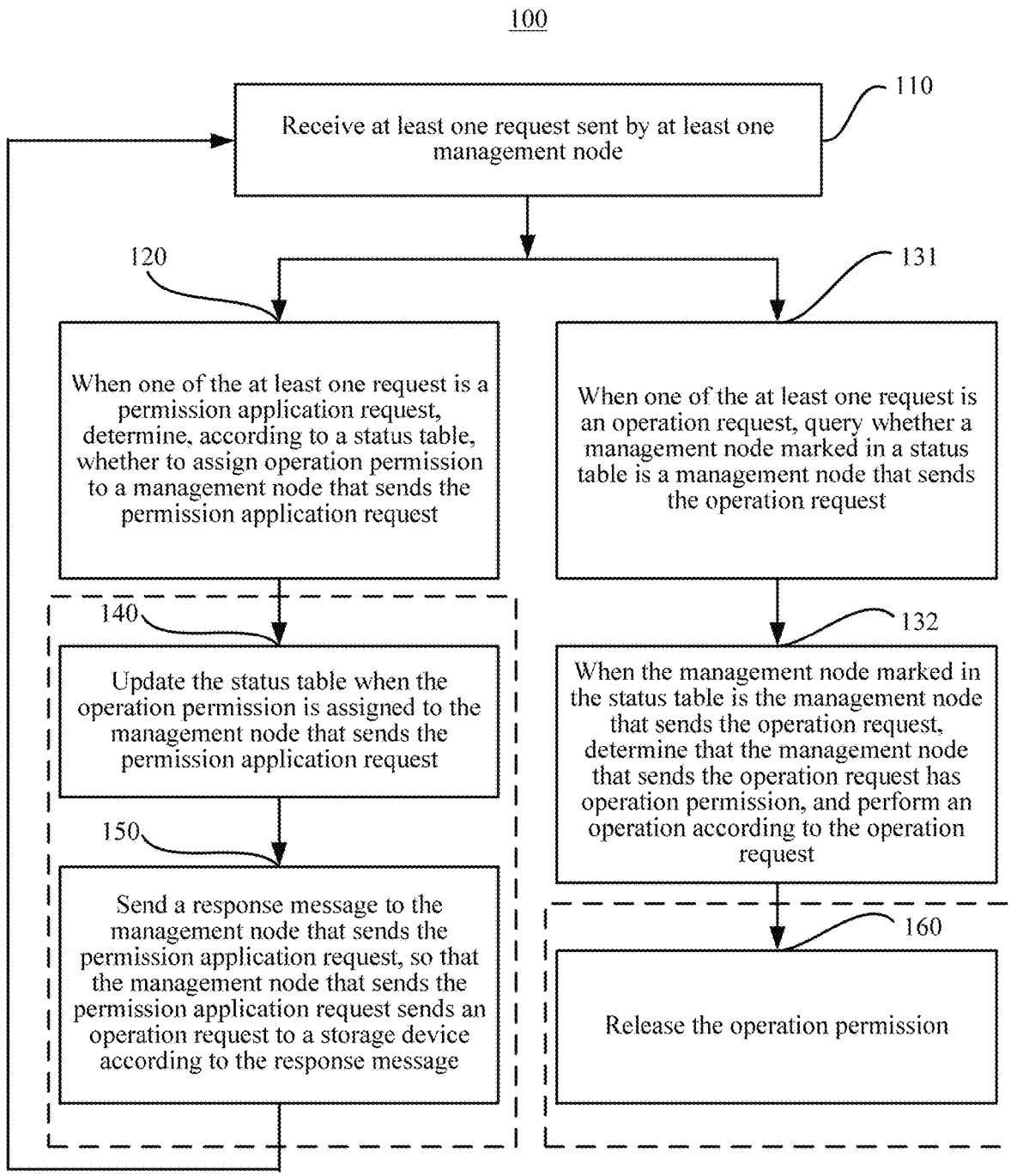
FIG. 5 is a schematic flowchart of a storage device operation control method according to another embodiment of the present application.

Optionally, in another embodiment of the present application, as shown in FIG. 5, the determining, according to the status table, whether the management node that sends the operation request has the operation permission includes the following steps:

131: Query whether a management node marked in the status table is the management node that sends the operation request.

132: When the management node marked in the status table is the management node that sends the operation request, determine that the management node that sends the operation request has the operation permission.

Specifically, in this embodiment of the present application, in the status table, management nodes may be recorded and operation permission of the management nodes may be marked. In a same time period, the storage device allows only one management node to have operation permission, and marks, in the status table, the management node as having operation permission. And marks the other management nodes as having no operation permission. When querying the status table for a management node marked as having operation permission, and determining that the management node marked as having operation permission in the status table and the management node that sends the operation request are a same management node, the storage device determines that the management node that sends the operation request has the operation permission, and the storage device may perform a corresponding operation according to the operation request.

For example, as shown by B in FIG. 4, the storage device queries for the management nodes and the permission statuses stored in the status table. If it is determined that the management node marked as having operation permission in the status table is BMC0, and the management node that sends the operation request is also BMC0, the storage device determines that the management node BMC0 has the operation permission. The storage device may perform a corresponding operation according to the operation request sent by the management node BMC0.

According to the storage device operation control method provided in this embodiment of the present application, operation permission is assigned to one of multiple management nodes requesting to apply for permission, and the corresponding operation is performed according to the operation request sent by the management node having the operation permission. This avoids a conflict caused by simultaneously performing an operation on a storage device by multiple management nodes, and prevents successive serial operations of one management node from being interrupted. In addition, an identity of the management node that sends the operation request is authenticated to ensure validity of the management node that sends the operation request. This prevents the serial operations from being interfered or interrupted by an operation request of another management node.

Optionally, in another embodiment of the present application, after the determining whether to assign operation permission to a management node that sends the permission application request, the method 100 further includes the following step:

140: Update a status table when the operation permission is assigned to the management node that sends the permission application request.

Specifically, when assigning operation permission to one of multiple management nodes, the storage device marks a permission status of the management node in the status table, so that after receiving a permission application request sent by another management node, the storage device queries the status table, to determine whether to assign operation permission to the management node that sends the permission application request. In this embodiment of the present application, when a management node has been marked in the status table as having operation permission, the storage device does not assign operation permission to a management node that sends a permission application request, and returns, to the management node that sends the permission application request, a response message indicating a permission application failure.

Optionally, in another embodiment of the present application, as shown in FIG. 5, after the updating a status table, the method 100 further includes the following step:

150: Send a response message to the management node that sends the permission application request, so that the management node that sends the permission application request sends an operation request to the storage device according to the response message.

Specifically, when assigning operation permission to one of multiple management nodes, the storage device updates the status table, and sends, to the management node to which the operation permission is assigned, a response message indicating a permission application success, so that the management node sends an operation request after receiving the response message.

In this embodiment of the present application, after sending, to the management node, the response message indicating a success in assigning the operation permission, the storage device may immediately receive the operation request sent by the management node, and process the operation request. Alternatively, after sending, to the management node, the response message indicating a success in assigning the operation permission, the storage device may first receive permission application requests sent by other multiple management nodes and then receive the operation request sent by the management node. Before processing the operation request sent by the management node, the storage device needs to process each previously received permission application request and return, to a corresponding management node, a response message indicating a permission application failure; and then performs a corresponding operation according to the received operation request sent by the management node.

Optionally, in another embodiment of the present application, as shown in FIG. 5, after the performing an operation according to the operation request, the method 100 further includes the following step:

160: Release the operation permission.

Specifically, after the storage device performs an operation according to an operation request, the storage device releases operation permission and updates the status table, to mark a permission status of a management node BMC0 as "0" in the status stable, where the status table is shown by E in FIG. 4, so that the storage device is used by another management node that sends an operation request to perform a corresponding operation. It should be understood that in this embodiment of the present application, the another management node may be a management node corresponding to the sent operation request that is exactly executed by the storage device, or may be any management node other than the management node.

Optionally, in another embodiment of the present application, after the receiving at least one request sent by at least one management node, the method 100 further includes:

serializing the request, to parse the request in a sequence of receiving the request.

Specifically, the storage device may simultaneously receive requests sent by multiple management nodes. When simultaneously receiving requests sent by the multiple management nodes, the storage device serializes the requests, that is, stores the received requests in the storage device, and sequentially parses the stored requests, to restore the requests to original requests.

According to the storage device operation control method provided in this embodiment of the present application, operation permission is assigned to the one of multiple management nodes requesting to apply for permission, and the corresponding operation is performed according to the operation request sent by the management node having the operation permission. This avoids a conflict caused by simultaneously performing an operation on a storage device by multiple management nodes, and prevents successive serial operations of one management node from being interrupted. In addition, an identity of the management node that sends the operation request is authenticated to ensure validity of the management node that sends the operation request. This prevents serial operations from being interfered or even interrupted by an operation request of another management node.

It should be understood that in this embodiment of the present application, the status table in FIG. 4 is merely intended to describe the technical solution in this embodiment of the present application in detail rather than limit a specific form of the status table in this embodiment of the present application.

Figure 6:
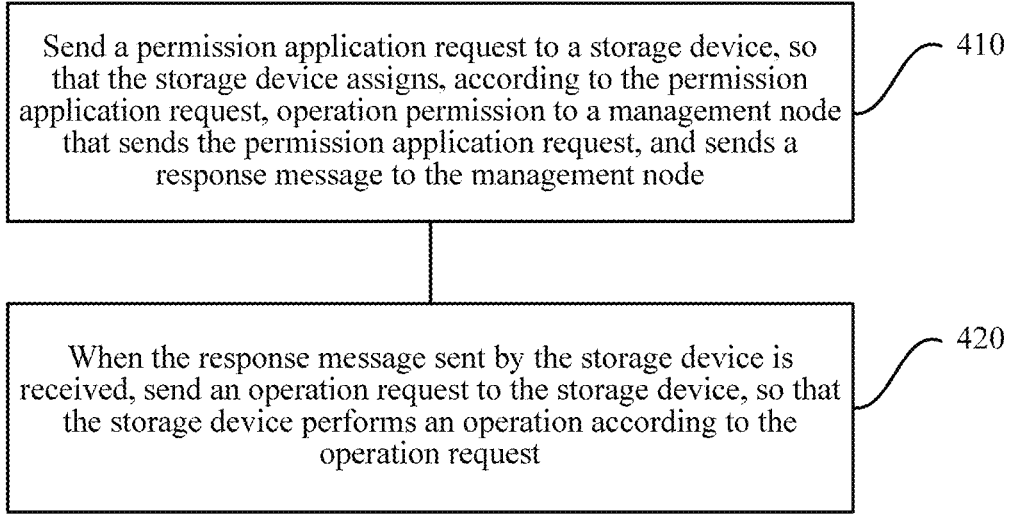
FIG. 6 is a schematic flowchart of a storage device operation control method according to still another embodiment of the present application.

FIG. 6 shows a storage device operation control method according to still another embodiment of the present application. The method 400 is executed by a management node, and the method 400 includes the following steps:

410: Send a permission application request to a storage device, so that the storage device assigns, according to the permission application request, operation permission to a management node that sends the permission application request, and sends a response message to the management node.

420: Receive the response message sent by the storage device.

430: Send an operation request to the storage device according to the response message, so that the storage device performs an operation according to the operation request.

Specifically, in this embodiment of the present application, the management node sends the permission application request to the storage device, so that when assigning the operation permission to the management node, the storage device sends, to the management node, the response message indicating a permission application success. After receiving the response message sent by the storage device, the management node sends the operation request to the storage device according to the response message, so that the storage device may perform a corresponding operation according to the operation request.

According to the storage device operation control method provided in this embodiment of the present application, the management node first applies to the storage device for operation permission, and then sends the operation request to the storage device when having the operation permission, so that the storage device performs the corresponding operation according to the operation request. This avoids a case in which operation requests are exclusive because multiple management nodes simultaneously access one storage device, and effectively ensures continuous execution of serial commands.

The storage device operation control method according to the embodiments of the present application is described in detail in the foregoing with reference to FIG. 3 to FIG. 6. A storage device and a management node according to embodiments of the present application are described in detail in the following with reference to FIG. 7 to FIG. 10.

Figure 7:
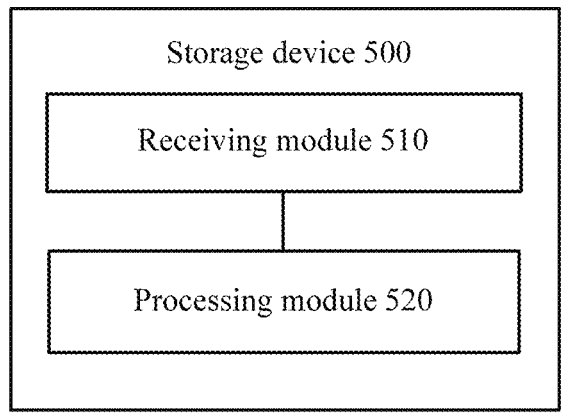
FIG. 7 is a schematic structural diagram of a storage device according to an embodiment of the present application.

FIG. 7 is a schematic structural diagram of a storage device according to an embodiment of the present application. As shown in FIG. 7, the storage device 500 includes a receiving module 510 and a processing module 520.

The receiving module 510 is configured to receive at least one request sent by at least one management node.

The processing module 520 is configured to: when one of the at least one request is a permission application request, determine whether to assign operation permission to a management node that sends the permission application request.

The processing module 520 is further configured to: when one of the at least one request is an operation request, determine whether a management node that sends the operation request has operation permission, and perform an operation according to the operation request when the management node that sends the operation request has the operation permission.

Specifically, the receiving module 510 receives requests sent by multiple management nodes. The request may be a permission application request or an operation request. The processing module 520 sequentially determines types of the received requests, and determines whether the received requests are permission application requests or operation requests. When a received request is the permission application request, the processing module 520 may determine, according to a current permission status, whether there is permission to be assigned to the management node that sends the permission application request. The current permission status may be determined by querying a status table. The storage device determines, according to the status table, whether a current status is that an operation is being currently performed. When the storage device currently performs no operation, and does not assign operation permission to another management node, the storage device assigns the operation permission to the management node that sends the permission application request.

In this embodiment of the present application, the processing module 520 may further determine the current permission status in another preset logical manner. This is not limited in this embodiment of the present application.

In this embodiment of the present application, the operation request may be a read operation, a write operation, or another operation.

It should be understood that in this embodiment of the present application, the request may be a predefined request set. When some storage devices executing some predefined requests, the other storage devices execute the other predefined requests.

According to the storage device operation control method provided in this embodiment of the present application, the storage device assigns operation permission to one of multiple management nodes requesting to apply for permission, and performs a corresponding operation according to an operation request sent by the management node having the operation permission. This avoids a conflict caused by simultaneously performing an operation on a storage device by multiple management nodes, and prevents successive serial operations from being interrupted.

Optionally, in another embodiment of the present application, the processing module 520 is further configured to update a status table when the operation permission is assigned to the management node that sends the permission application request.

Specifically, when assigning operation permission to one of multiple management nodes, the processing module 520 marks a permission status of the management node in the status table, so that after the receiving module 510 receives a permission application request sent by another management node, the processing module 520 queries the status table, to determine whether to assign operation permission to the management node that sends the permission application request. In this embodiment of the present application, when a management node has been marked in the status table as having operation permission, the processing module 520 does not assign operation permission to a management node that sends a permission application request, and returns, to the management node that sends the permission application request, a response message indicating a permission application failure.

Figure 8:
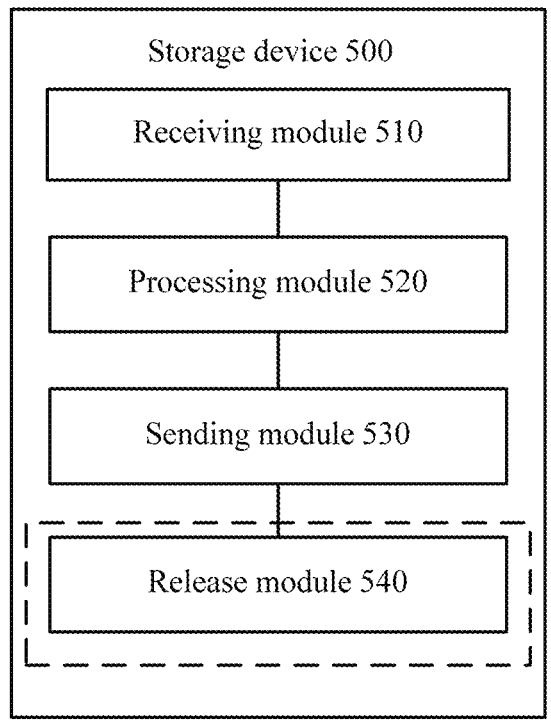
FIG. 8 is a schematic structural diagram of a storage device according to another embodiment of the present application.

Optionally, in another embodiment of the present application, as shown in FIG. 8, the storage device 500 further includes a sending module 530, configured to send a response message to the management node that sends the permission application request, so that the management node that sends the permission application request sends an operation request to the storage device according to the response message.

Specifically, when assigning operation permission to one of multiple management nodes, the storage device updates the status table, and sends, to the management node to which the operation permission is assigned, a response message indicating a permission application success, so that the management node sends an operation request after receiving the response message.

In this embodiment of the present application, after the sending module 530 sends, to the management node, the response message indicating a success in assigning the operation permission, the receiving module 510 may immediately receive the operation request sent by the management node, and process the operation request. Alternatively, after the sending module 530 sends, to the management node, the response message indicating a success in assigning the operation permission, the receiving module 510 may first need to receive permission application requests sent by other multiple management nodes and then receive the operation request sent by the management node. Before processing the operation request sent by the management node, the processing module 520 needs to process each previously received permission application request and return, to a corresponding management node, a response message indicating a permission application failure; and performs a corresponding operation according to the received operation request sent by the management node.

Optionally, in another embodiment of the present application, the processing module 520 is specifically configured to:

query whether a management node marked in the status table is the management node that sends the operation request; and when the management node marked in the status table is the management node that sends the operation request, determine that the management node that sends the operation request has the operation permission.

Specifically, in this embodiment of the present application, in the status table, management nodes may be recorded and operation permission of the management nodes may be marked. In a same time period, the storage device allows one management node to have operation permission, and marks, in the status table, the management node as having operation permission. And marks the other management nodes as having no operation permission. When querying the status table for a management node marked as having operation permission, and determining that the management node marked as having operation permission in the status table and the management node that sends the operation permission are a same management node, the processing module 520 determines that the management node that sends the operation request has the operation permission, and the processing module 520 may perform a corresponding operation according to the operation request.

Optionally, in another embodiment of the present application, as shown in FIG. 8, the storage device 500 further includes a release module 540, configured to release the operation permission after the operation is performed according to the operation request.

Specifically, after performing an operation according to an operation request, the processing module 520 releases operation permission and updates the status table, to change a permission status mark of a management node in the status table to a mark of having no operation permission, so that the storage device is used by another management node that sends an operation request to perform a corresponding operation.

Optionally, in another embodiment of the present application, the processing module 520 is further configured to serialize the request, to parse the request in a sequence of receiving the request.

Specifically, the receiving module 510 may simultaneously receive requests sent by multiple management nodes. When the receiving module 510 simultaneously receives requests sent by multiple management nodes, the processing module 520 serializes the received requests, that is, stores the received requests in the storage device, and sequentially parses the stored requests, to restore the requests to original requests.

According to the storage device provided in this embodiment of the present application, the operation permission is assigned to the one of multiple management nodes requesting to apply for permission, and the corresponding operation is performed according to the operation request sent by the management node having the operation permission. This avoids a conflict caused by simultaneously performing an operation on a storage device by multiple management nodes, and prevents successive serial operations of one management node from being interrupted. In addition, an identity of the management node that sends the operation request is authenticated to ensure validity of the management node that sends the operation request. This prevents the serial operations from being interfered or even interrupted by an operation request of another management node.

It should be noted that in this embodiment of the present application, the foregoing and other operations and/or functions of the modules of the storage device 500 according to this embodiment of the present application are intended to implement corresponding processes in the methods shown in FIG. 3 and FIG. 5. For brevity, details are not described herein again.

Figure 9:
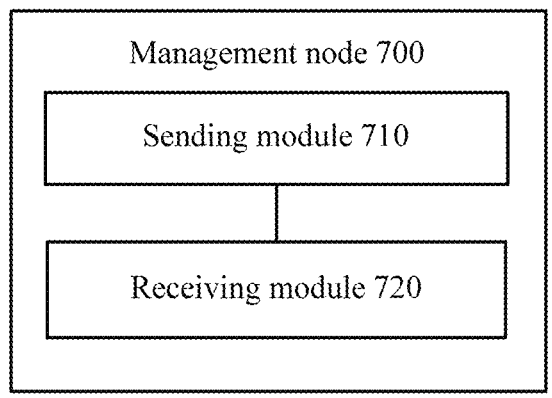
FIG. 9 is a schematic structural diagram of a management node according to an embodiment of the present application.

FIG. 9 shows a management node according to an embodiment of the present application. The management node 700 includes a sending module 710 and a receiving module 720.

The sending module 710 is configured to send a permission application request to a storage device, so that the storage device assigns, according to the permission application request, operation permission to a management node that sends the permission application request, and sends a response message to the management node.

The receiving module 720 is configured to receive the response message sent by the storage device.

The sending module 710 is further configured to send an operation request to the storage device according to the response message, so that the storage device performs an operation according to the operation request.

Specifically, in this embodiment of the present application, the sending module 710 sends the permission application request to the storage device, so that when assigning the operation permission to the management node, the storage device sends, to the management node, the response message indicating a permission application success. After the receiving module 720 receives the response message sent by the storage device, the sending module 710 sends the operation request to the storage device according to the response message, so that the storage device may perform a corresponding operation according to the operation request.

According to the management node provided in this embodiment of the present application, the management node first applies to a storage device for operation permission, and then sends an operation request to the storage device when having the operation permission, so that the storage device performs a corresponding operation according to the operation request. This avoids a case in which operation requests are exclusive because multiple management nodes simultaneously access one storage device, and effectively ensures continuous execution of serial commands.

It should be noted that in this embodiment of the present application, the foregoing and other operations and/or functions of the modules of the management node 700 according to this embodiment of the present application are intended to implement corresponding processes in the method shown in FIG. 6. For brevity, details are not described herein again.

Figure 10:
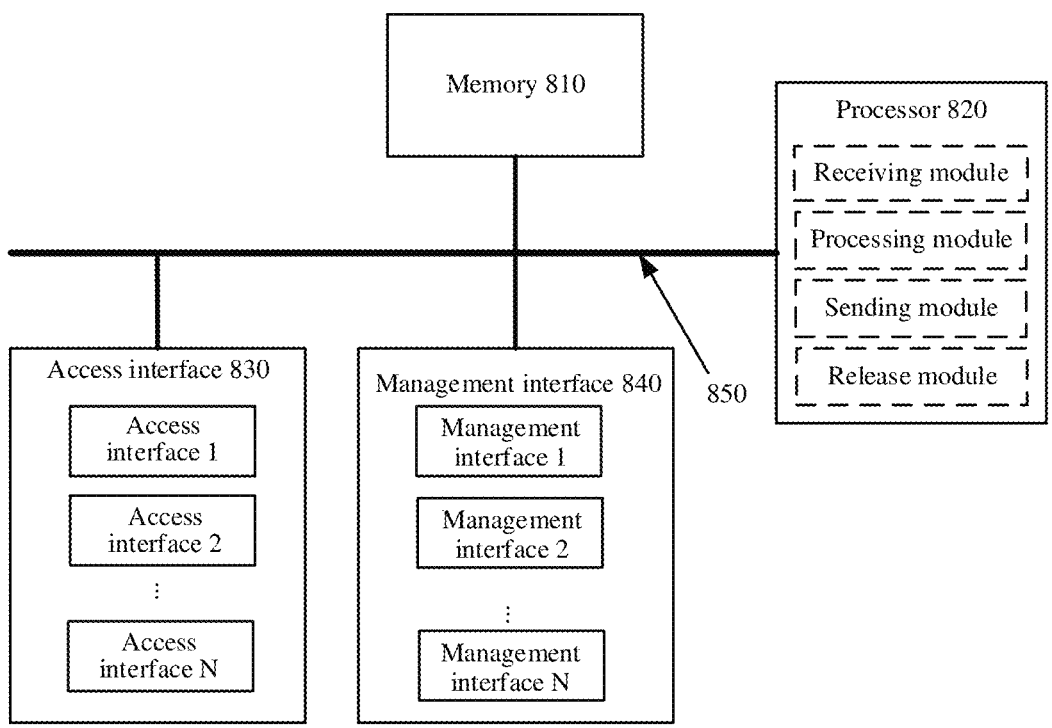
FIG. 10 is a schematic structural diagram of a storage device according to another embodiment of the present application.

FIG. 10 is a schematic structural diagram of another storage device according to an embodiment of the present application. As shown in FIG. 10, the storage device 800 includes a memory 810, a processor 820, multiple access interfaces 830, multiple management interfaces 840, and a communications bus system 850. The memory 810, the processor 820, the multiple access interfaces 830, and the multiple management interfaces 840 are connected by using the communications bus system 850.

The memory 810 is configured to store an instruction.

The processor 820 is configured to invoke the instruction stored in the memory 810, so as to perform the following steps by using a receiving module, a processing module, and a sending module included in the processor 820:

receiving, by using at least one access interface, at least one request sent by at least one management node; managing the at least one management request by using the management interfaces; and when one of the at least one request is a permission application request, determining, according to a current permission status, whether to assign operation permission to a management node that sends the permission application request; or when one of the at least one request is an operation request, determining, according to a current permission status, whether a management node that sends the operation request has operation permission, and performing an operation according to the operation request when the management node that sends the operation request has the operation permission.

In this embodiment of the present application, for the current permission status, a permission status of each access interface and an execution status of the storage device may be recorded in a status table, or a permission status and an execution status may be recorded in another logical form.

It should be noted that in this embodiment of the present application, there are multiple access interfaces 830, for example, an access interface 1, an access interface 2, . . . , an access interface N. N is an integer greater than or equal to 1. There are also multiple management interfaces 840, which may be represented by management interfaces 1 to N.

In this embodiment of the present application, after a corresponding operation request is executed, a release module of the processor 820 releases operation permission, so that the storage device assigns the operation permission to another management node, to perform a corresponding operation. It should be noted that in this embodiment of the present application, the another management node may be a management node corresponding to the operation request that is exactly executed, or may be a management node other than the management node.

Based on the storage device provided in this embodiment of the present application, the operation permission is assigned to the one of multiple management nodes requesting to apply for permission, and the corresponding operation is performed according to the operation request sent by the management node having the operation permission. This avoids a conflict caused by simultaneously performing an operation on a storage device by multiple management nodes, and prevents successive serial operations from being interrupted.

It should be understood that in this embodiment of the present application, the processor 820 may be a central processing unit (CPU), or the processor 820 may be another general purpose processor, a digital signal processor (DSP), an application-specific integrated circuit (ASIC), a field-programmable gate array (FPGA) or another programmable logical device, a discrete gate or transistor logical device, a discrete hardware component, or the like. The general purpose processor may be a microprocessor, or the processor may be any conventional processor or the like.

The bus system 850 may include a power bus, a control bus, a status signal bus, and the like in addition to a data bus. However, for clear description, various types of buses in the figure are marked as the bus system 850.

In an implementation process, each step of the foregoing method may be completed by using an integrated logical circuit of hardware in the processor 820 or an instruction in a software form. The steps of the methods disclosed with reference to the embodiments of the present application may be directly performed and completed by means of a hardware processor, or may be performed and completed by using a combination of hardware and software modules in the processor 820. The software module may be located in a mature storage medium in the art, such as a random access memory, a flash memory, a read-only memory, a programmable read-only memory, an electrically-erasable programmable memory, or a register. The storage medium is located in the memory 810, and the processor 820 reads information in the memory 810 and completes the steps of the foregoing method in combination with hardware of the processor 820. To avoid repetition, details are not described herein.

It should be noted that in this embodiment of the present application, the storage device 800 in this embodiment of the present application may correspond to the storage device 500 in FIG. 7 and FIG. 8, and the foregoing and other operations and/or functions of the modules of the storage device 800 according to this embodiment of the present application are intended to implement corresponding processes in the methods shown in FIG. 3 and FIG. 5. For brevity, details are not described herein again.

An embodiment of the present application provides a non-volatile computer-readable storage medium that stores one or more programs. The one or more programs include an instruction, and the instruction is used by a storage device to execute the following events:

receiving at least one request sent by at least one management node; and when one of the at least one request is a permission application request, determining, according to a current permission status, whether to assign operation permission to a management node that sends the permission application request; or when one of the at least one request is an operation request, determining, according to a current permission status, whether a management node that sends the operation request has operation permission, and performing an operation according to the operation request when the management node that sends the operation request has the operation permission.

In this embodiment of the present application, the current permission status may be determined by querying a status table. A status about permission assignment of an access interface and a request execution status are recorded in the status table. Alternatively, in this embodiment of the present application, the permission status and the request execution status may be represented in another logical manner. This is not limited in this embodiment of the present application.

After performing the operation according to the operation request, the storage medium releases the operation permission, so that the operation permission is assigned to another management node that sends a permission application request and the storage device performs a corresponding operation.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms. The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present application. In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a non-transitory computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of the present application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present application, but are not intended to limit the protection scope of the present application. Any modification or replacement figured out by a person skilled in the art within the technical scope disclosed in the present application shall fall within the protection scope of the present application. Therefore, the protection scope of the present application shall be subject to the protection scope of the claims.

What is claimed is:

1. A method for storage device operation control, the method comprising:
   receiving, by a storage device, a plurality of requests from a plurality of management nodes, wherein each request in the plurality of requests is an operation request;
   determining, by the storage device based on a preset arbitration method, that at least one management node of the plurality of management nodes has operation permission, wherein only one management node has operation permission with respect to the storage device in a given time period, wherein the preset arbitration method comprises a permission status group and a request execution status group, wherein the permission status group identifies operation permission of each management node, and the request execution status group is used to record whether the storage device is performing a requested operation;
   selecting, by the storage device, a first management node in the at least one management node, wherein a first request of the plurality of requests is received by the storage device from the first management node; and
   performing, by the storage device, an operation associated with the first request.

2. The method according to claim 1, wherein determining that the at least one management node has the operation permission comprises:
   determining that the at least one management node and a management node recorded in the permission status group as having operation permission are a same management node.

3. The method according to claim 1, before the receiving, by the storage device, the plurality of requests from the plurality of management nodes, the method further comprising:
   receiving, by the storage device, a second request from a second management node, wherein the second request is a permission application request;
   querying, by the storage device, a status in a request execution status group; and
   when the storage device does not perform an operation and no operation permission is assigned to another management node, allocating, by the storage device, operation permission to the second management node that sent the second request.

4. The method according to claim 1, further comprising:
   updating, by the storage device, a status of the storage device, wherein the status of the storage device indicates the storage device is processing an operation request of the first management node;
   updating, by the storage device after the storage device performs the operation associated with the first request, a status in a request execution status group to an idle state; and
   updating the permission of the first management node in a permission status group to an invalid state, wherein the idle state identifies that the storage device currently performs no operation, and the invalid state identifies that the at least one management node has no operation permission.

5. The method according to claim 1, wherein the plurality of management nodes and the storage device are in a non-volatile memory express (NVMe) storage system, and each management node included in the NVMe storage system comprises a host or a baseboard management controller.

6. A storage device, comprising:
a memory having a plurality of instructions stored thereon; and
a processor configured to execute the plurality of instructions to perform the steps of:
receiving a plurality of requests from a plurality of management nodes, wherein each request in the plurality of requests is an operation request;
determining, based on a preset arbitration method, that at least one management node of the plurality of management nodes has operation permission, wherein only one management node has operation permission with respect to the storage device in a given time period, wherein the preset arbitration method comprises a permission status group and a request execution status group, wherein the permission status group identifies operation permission of each management node, and the request execution status group is used to record whether the storage device is performing a requested operation;
selecting a first management node in the at least one management node, wherein a first request of the plurality of requests is received by the storage device from the first management node; and
performing an operation associated with the first request.

7. The storage device according to claim 6, wherein the determining that the at least one management node has the operation permission comprises:
determining that the at least one management node and a management node recorded in the permission status group as having operation permission are a same management node.

8. The storage device according to claim 6, wherein before the receiving, by the storage device, the plurality of requests from the plurality of management nodes, the processor is further configured to:
receive a second request sent by a second management node, wherein the second request is a permission application request;
query a status in a request execution status group; and
when the storage device does not perform an operation and no operation permission is assigned to another management node, allocate operation permission to the second management node that sent the second request.

9. The storage device according to claim 6, wherein the processor is further configured to:
update a status of the storage device, wherein the status of the storage device indicates the storage device is processing an operation request of the first management node;
update, after the storage device performs the operation associated with the first request, a status in a request execution status group to an idle state; and
update the permission of the first management node in a permission status group to an invalid state, wherein the idle state identifies that the storage device currently performs no operation, and the invalid state identifies that the management node has no operation permission.

10. The storage device according to claim 6, wherein the plurality of management nodes and the storage device are in a non-volatile memory express (NVMe) storage system, wherein each management node included in the NVMe storage system comprises a host or a baseboard management controller.

11. A non-volatile memory express (NVMe) storage system, comprising:
a plurality of management nodes; and
a storage device, wherein the storage device is configured to:
receive a plurality of requests from the plurality of management nodes, wherein each request of the plurality of requests is an operation request;
determine, based on a preset arbitration method, that at least one management node of the plurality of management nodes has operation permission, wherein only one management node has operation permission with respect to the storage device in a given time period, wherein the preset arbitration method comprises a permission status group and a request execution status group, wherein the permission status group identifies operation permission of each management node, and the request execution status group is used to record whether the storage device is performing a requested operation;
select a first management node in the at least one management node, wherein a first request of the plurality of requests is received by the storage device from the first management node; and
perform an operation associated with the first request.

12. The NVMe storage system according to claim 11, wherein the storage device is configured to determine that the at least one management node and a management node recorded in the permission status group as having operation permission are a same management node.

13. The NVMe storage system according to claim 11, wherein the storage device is further configured to:
receive a second request from a second management node, wherein the second request is a permission application request;
query a status in a request execution status group; and
allocate, when the storage device does not perform an operation and no operation permission is assigned to another management node, operation permission to the second management node that sent the second request.

14. The NVMe storage system according to claim 11, wherein the storage device is further configured to:
update a status of the storage device, wherein the status of the storage device indicates the storage device is processing an operation request of the first management node;
update a status in a request execution status group to an idle state; and
update the permission of the first management node in a permission status group to an invalid state, wherein the idle state identifies that the storage device currently performs no operation, and the invalid state identifies that the at least one management node has no operation permission.

15. The NVMe storage system according to claim 11, wherein each management node included in the NVMe storage system comprises a host or a baseboard management controller.

16. A non-transitory computer-readable storage medium storing instructions that, when executed by a processor, cause a storage device to perform steps of:
receiving a plurality of requests from a plurality of management nodes, wherein the storage device and the plurality of management nodes are included in a non-volatile memory express (NVMe) storage system, wherein each request of the plurality of requests is an operation request;

determining, based on a preset arbitration method, that at least one management node of the plurality of management nodes has operation permission, wherein only one management node has operation permission with respect to the storage device in a given time period, wherein the preset arbitration method comprises a permission status group and a request execution status group, wherein the permission status group identifies operation permission of each management node, and the request execution status group is used to record whether the storage device is performing a requested operation;

selecting a first management node in the at least one management node, wherein a first request of the plurality of requests is received by the storage device from the first management node; and performing an operation associated with the first request.

17. The computer-readable storage medium according to claim 16, wherein determining that the at least one management node has the operation permission comprises:

determining that the at least one management node and a management node recorded in the permission status group as having operation permission are a same management node.

* * * * *